United States Patent
Togawa et al.

(10) Patent No.: US 8,417,384 B2
(45) Date of Patent: Apr. 9, 2013

(54) INFORMATION PROCESSING SYSTEM, ROBOT APPARATUS, AND CONTROL METHOD THEREFOR

(75) Inventors: Keiji Togawa, Tokyo (JP); Masayuki Chatani, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 1139 days.

(21) Appl. No.: 12/142,109

(22) Filed: Jun. 19, 2008

(65) Prior Publication Data

US 2009/0037023 A1 Feb. 5, 2009

(30) Foreign Application Priority Data

Jun. 29, 2007 (JP) ................................. 2007-173130

(51) Int. Cl.
*G05B 19/042* (2006.01)
*G06F 19/00* (2011.01)

(52) U.S. Cl.
USPC .............................................. 700/258; 901/1

(58) Field of Classification Search ........................ 901/1
See application file for complete search history.

(56) References Cited

U.S. PATENT DOCUMENTS

| | | | | |
|---|---|---|---|---|
| 6,381,515 B1* | 4/2002 | Inoue et al. | ................... | 700/245 |
| 6,658,325 B2* | 12/2003 | Zweig | ............................ | 700/245 |
| 6,865,447 B2* | 3/2005 | Lau et al. | ....................... | 700/258 |
| 7,388,879 B2* | 6/2008 | Sabe et al. | ..................... | 370/466 |
| 7,720,572 B2* | 5/2010 | Ziegler et al. | ................. | 700/245 |
| 7,957,837 B2* | 6/2011 | Ziegler et al. | ................. | 700/258 |
| 2005/0071047 A1* | 3/2005 | Okabayashi et al. | ......... | 700/245 |
| 2005/0091684 A1* | 4/2005 | Kawabata et al. | .............. | 725/35 |
| 2006/0052676 A1* | 3/2006 | Wang et al. | ................... | 600/300 |
| 2007/0192910 A1* | 8/2007 | Vu et al. | ........................... | 901/17 |
| 2007/0198128 A1* | 8/2007 | Ziegler et al. | ................. | 700/245 |
| 2007/0276541 A1* | 11/2007 | Sawasaki | ....................... | 700/253 |
| 2009/0164123 A1* | 6/2009 | Moriguchi | ..................... | 701/301 |
| 2009/0173561 A1* | 7/2009 | Moriguchi et al. | ........... | 180/167 |
| 2010/0094463 A1* | 4/2010 | Okabayashi et al. | ......... | 700/264 |
| 2010/0268697 A1* | 10/2010 | Karlsson et al. | .............. | 707/694 |
| 2010/0298976 A1* | 11/2010 | Sugihara et al. | .............. | 700/248 |
| 2012/0303202 A1* | 11/2012 | Durkos et al. | .................. | 701/26 |

FOREIGN PATENT DOCUMENTS

| | | |
|---|---|---|
| JP | 3091135 | 4/1991 |
| JP | 2000-210476 | 8/2000 |
| WO | WO 2007132571 A1 * | 11/2007 |

* cited by examiner

*Primary Examiner* — Khoi Tran
*Assistant Examiner* — Jason Holloway
(74) *Attorney, Agent, or Firm* — Matthew B. Dernier, Esq.; Gibson & Dernier LLP (57) ABSTRACT

Provided is an information processing system including a display device for displaying an image on a display screen, and a robot apparatus for performing input/output of information from/to a user. The information processing system acquires a position of the display screen in a real space, and moves the robot apparatus based on the acquired position of the display screen.

6 Claims, 11 Drawing Sheets

FIG.1

USER

INFORMATION PROCESSING SYSTEM, ROBOT APPARATUS, AND CONTROL METHOD THEREFOR

BACKGROUND OF THE INVENTION

1. Field of the Invention

The present invention relates to a robot apparatus for performing input/output of information from/to a user, an information processing system including the robot apparatus, and a control method for the robot apparatus.

2. Description of the Related Art

Up to now, there is known a robot apparatus that moves autonomously in a room of a general house to provide a user with various sorts of information or receive input of various types of information from the user. As examples of the robot apparatus, JP 3091135 B2 and JP 2000-210476 A disclose techniques in which the robot apparatus operates in association with an image displayed on a display screen of a display device such as a home-use television set by being connected to an information processing device such as a home-use game machine. According to such techniques described above, a method of, for example, displaying a game image on a screen and at the same time causing a robot apparatus to execute movements relating to the game allows input/output of information from/to a user by a variety of means.

The above-mentioned techniques of the conventional examples may cause such a problem that if the robot apparatus and the screen of the display device are located in different directions when viewed from the user, the user needs to frequently change the orientation of their face to view an image displayed on the screen at one time and to receive information provided by the robot apparatus or input information to the robot apparatus at another time. In order to solve such a problem, the user must move to another position or shift the location where the robot apparatus is placed, which may place a burden on the user.

SUMMARY OF THE INVENTION

The present invention has been made in view of the above-mentioned circumstances, and an object thereof is to provide a robot apparatus which can reduce a burden on a user in performing input/output of information from/to the user in relation to an image displayed on a screen, an information processing system including the robot apparatus, and a control method for the robot apparatus.

An information processing system according to the present invention includes: a display device for displaying an image on a display screen; a robot apparatus for performing input/output of information from/to a user; screen position acquisition means for acquiring a position of the display screen in a real space; and movement control means for moving the robot apparatus based on the position of the display screen acquired by the screen position acquisition means.

The above-mentioned information processing system may further include user position acquisition means for acquiring a position of the user in the real space, and the movement control means may move the robot apparatus based on the position of the display screen and the position of the user acquired by the user position acquisition means.

Further, in the information processing system, the movement control means may determine a possible movement area for the robot apparatus based on the position of the display screen and the position of the user, and move the robot apparatus according to the determined possible movement area.

Further, the possible movement area may include an area in which an angle formed between a line drawn from the position of the user toward each point within the possible movement area and a line drawn from the position of the user toward the display screen is equal to or less than a predetermined value.

Further, in the information processing system, the movement control means may change a direction in which the robot apparatus inputs/outputs information based on the position of the user.

Further, the information processing system may further include means for changing a position of a display element displayed on the display screen according to the position of the robot apparatus moved by the movement control means.

Further, according to the present invention, a robot apparatus for performing input/output of information from/to a user, which is connected to a display device for displaying an image on a display screen, includes: screen position acquisition means for acquiring a position of the display screen in a real space; and movement means for moving to a position determined based on the position of the display screen acquired by the screen position acquisition means.

Further, according to the present invention, a control method for a robot apparatus for performing input/output of information from/to a user, which is connected to a display device for displaying an image on a display screen, includes: a screen position acquisition step of acquiring a position of the display screen in a real space; and a movement control step of moving the robot apparatus based on the position of the display screen acquired in the screen position acquisition step.

DESCRIPTION OF THE PREFERRED EMBODIMENTS

Hereinafter, description will be given of an embodiment of the present invention with reference to the drawings.

Figure 1:
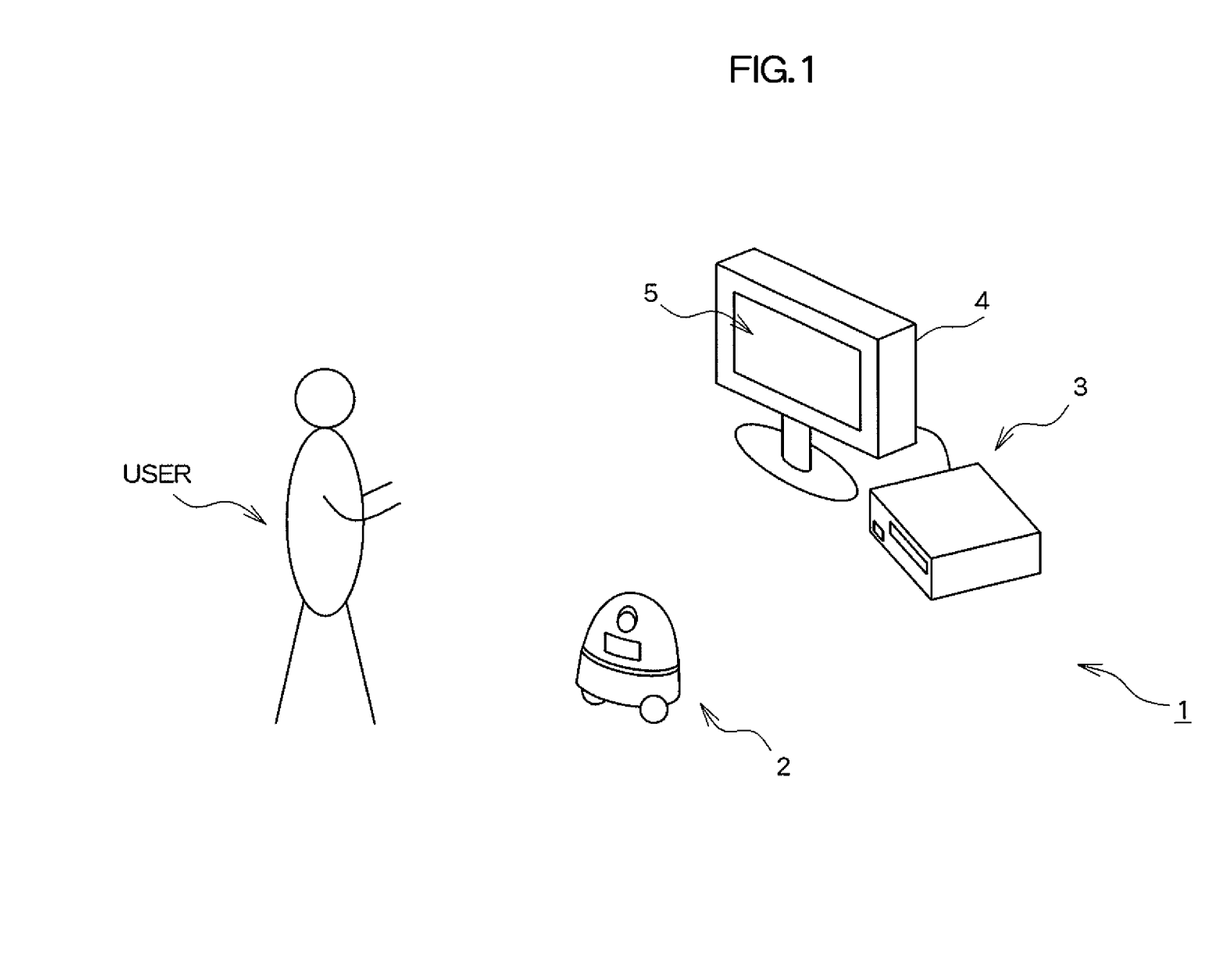
FIG. 1 is a conceptual diagram showing an example of how a robot apparatus according to an embodiment of the present invention is used.

FIG. 1 is a conceptual diagram showing an example of how an information processing system 1 according to the embodiment of the present invention is used. As shown in FIG. 1, the information processing system 1 includes a robot apparatus 2, a computer 3, and a display device 4. The robot apparatus 2 is placed in a room, for example, and communicably connected to the computer 3 in a wired or wireless manner. In association with the computer 3, the robot apparatus 2 implements a function of receiving input of information from a user who is present in the room, a function of providing the user with various sorts of information, and other such functions.

Figure 2:
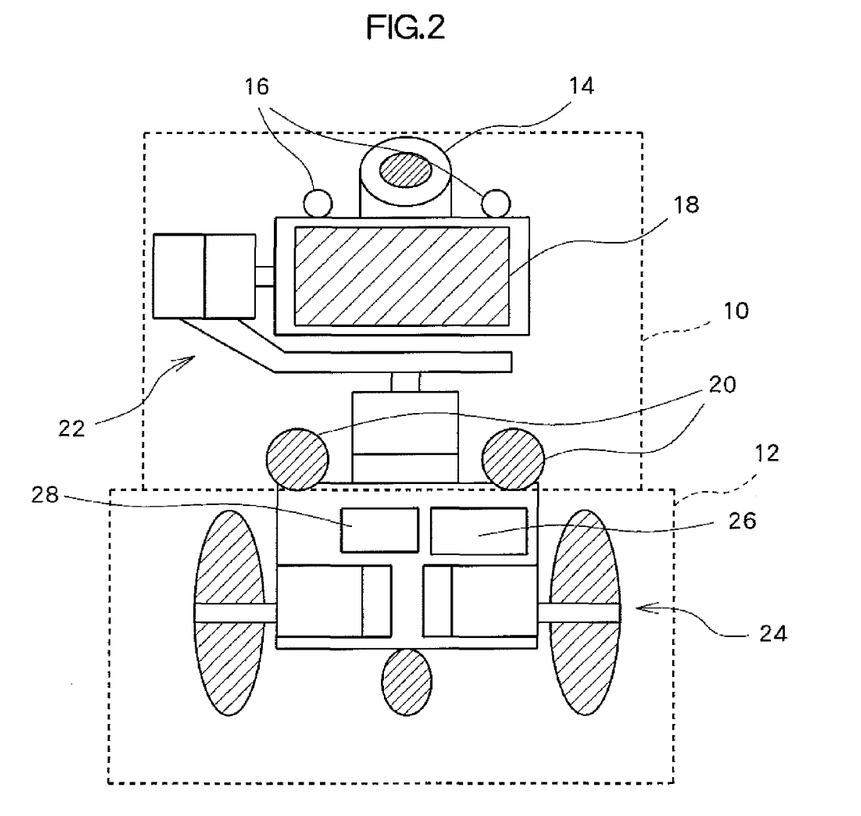
FIG. 2 is a structural diagram showing an example of a structure of the robot apparatus according to the embodiment of the present invention.

FIG. 2 is a structural diagram schematically showing an example of an internal structure of the robot apparatus 2. As shown in FIG. 2, the robot apparatus 2 according to this embodiment has a structure roughly divided into an interface section 10 and a body section 12. The interface section 10 includes a camera 14, a microphone 16, a display 18, a speaker 20, and an interface drive section 22. The body section 12 includes a main body drive section 24, a position detection section 26, and a circuit section 28.

The camera 14 takes an image of surroundings of the robot apparatus 2. The microphone 16 collects sounds around the robot apparatus 2. Note that the microphone 16 may be a directional microphone having a high sensitivity to sound in a specific direction. Through the camera 14 and the microphone 16, the information processing system 1 receives input of information in the form of a gesture or voice of the user. To be specific, by analyzing the image containing the user which is taken by the camera 14, the sound of the user's voice which is collected by the microphone 16, the information processing system 1 implements processing according to the information inputted by the user.

The display 18 displays various sorts of information as an image. The speaker 20 outputs various sorts of voice information. The display 18 and the speaker 20 operate as information outputting means for outputting the various sorts of information to the user.

The interface drive section 22 includes, for example, an actuator, and performs drive control for rotating the entirety of the interface section 10 against the body section 12 under control of a control section 30, which will be described later, included in the circuit section 28. The driving of the interface drive section 22 reorients each of the camera 14, the microphone 16, the display 18, and the speaker 20 toward an arbitrary direction about a rotation axis of a main body of the robot apparatus 2. Note that the interface drive section 22 changes not only a horizontal direction orientation of the interface section 10 but also a vertical direction orientation (elevation angle) of the camera 14, the display 18, and the like. In addition, the interface drive section 22 includes a sensor and the like to detect a rotation amount by which the interface section 10 is actually rotated by the drive control and output the rotation amount to the control section 30.

The main body drive section 24 includes, for example, an actuator and drive wheels, and drives the entirety of the robot apparatus 2 under control of the control section 30. The operation of the main body drive section 24 allows the robot apparatus 2 to move in a room and reorient the main body. The robot apparatus 2 also provides information to the user by moving under control of the main body drive section 24.

The position detection section 26 detects information on a position of the main body of the robot apparatus 2. The position detection section 26 includes, for example, a sensor such as an acceleration sensor and a gyro sensor, and detects information on a velocity and direction of the motion of the robot apparatus 2. The position detection section 26 may further include a global positioning system (GPS) receiver. By using detection results from the position detection section 26, the information processing system 1 can identify a change in the position and the orientation of the robot apparatus 2.

Figure 3:
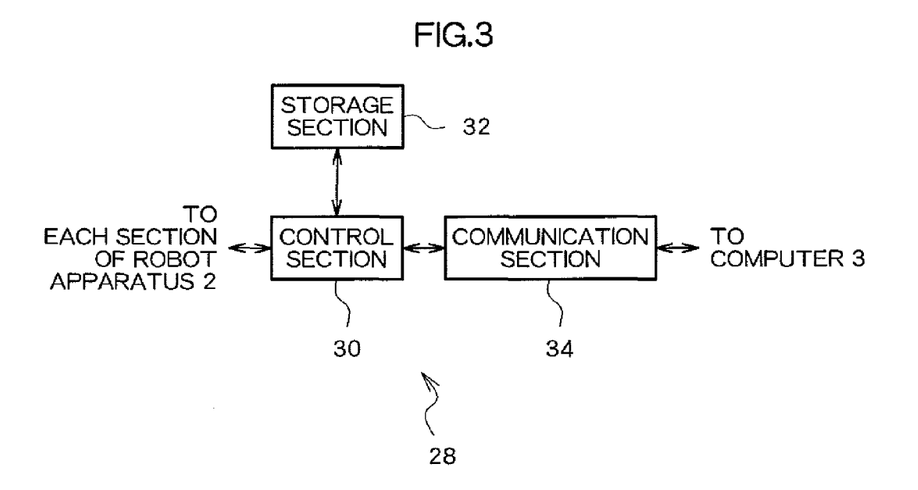
FIG. 3 is a configuration block diagram showing an example of a configuration of a circuit section included in the robot apparatus according to the embodiment of the present invention.

As shown in FIG. 3, the circuit section 28 includes the control section 30, a storage section 32, and a communication section 34.

The control section 30 is, for example, a microprocessor, and performs a control on each component of the robot apparatus 2 based on a program stored in the storage section 32 and a control command transmitted from the computer 3. To be specific, the control section 30 acquires image information taken by the camera 14 and voice information collected by the microphone 16, and executes various processings according to that information. In addition, based on that acquired information and data received from the computer 3, the control section 30 outputs various sorts of information to the display 18 and the speaker 20, or controls the main body drive section 24 to move the main body of the robot apparatus 2.

The storage section 32 includes, for example, a memory device such as a RAM or a ROM, and stores a program executed by the control section 30. In addition, the storage section 32 temporarily stores various information on the user acquired by the robot apparatus 2, such as data of the image taken by the camera 14 and data of the sound collected by the microphone 16. The communication section 34 is a communication interface of, for example, a wireless LAN, a Bluetooth standard, or a universal serial bus (USB) standard, and relays transmission/reception of information between the control section 30 and the computer 3.

Figure 4:
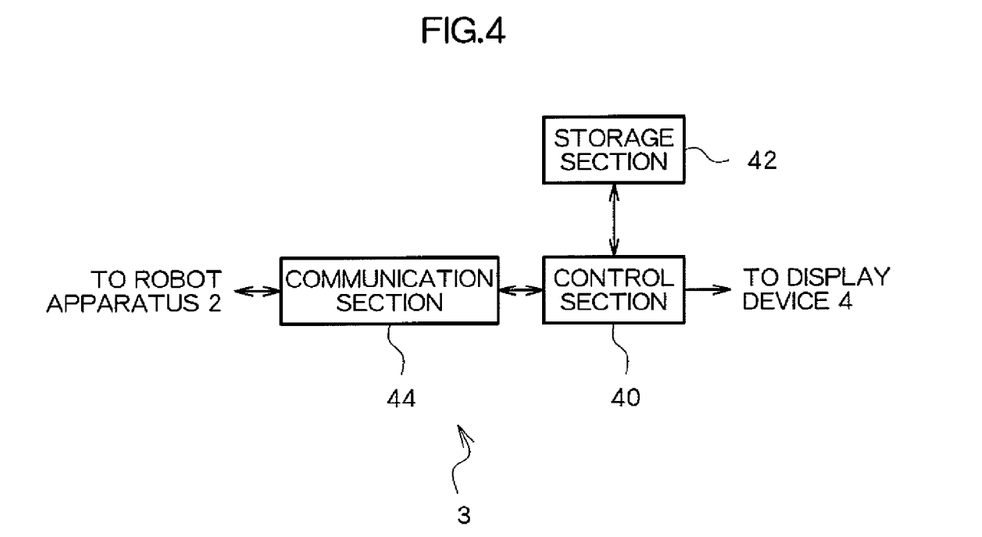
FIG. 4 is a configuration block diagram showing an example of a configuration of a computer.

The computer 3 is, for example, a home-use game machine or a personal computer, and as shown in FIG. 4, includes a control section 40, a storage section 42, and a communication section 44. The computer 3 is also connected to the display device 4.

The control section 40 includes a CPU or the like, and executes various information processing according to programs stored in the storage section 42. The storage section 42 includes a memory device such as a RAM or a ROM and a disk drive such as a hard disk drive, and stores the programs executed by the control section 40. The communication section 44 is an interface of a standard that allows communications with the communication section 34 of the robot apparatus 2, and performs transmission/reception of various sorts of information to/from the robot apparatus 2 via the communication section 34.

In this embodiment, the control section 40 generates an image to be displayed on the display device 4, and outputs the image to a predetermined memory area (frame buffer). The image information outputted to the frame buffer is converted into a video signal and then outputted to the display device 4.

The display device 4 includes a display screen 5, and displays various sorts of images on the display screen 5 based on the video signal outputted by the computer 3. The display device 4 may be, for example, a home-use television set.

Figure 5:
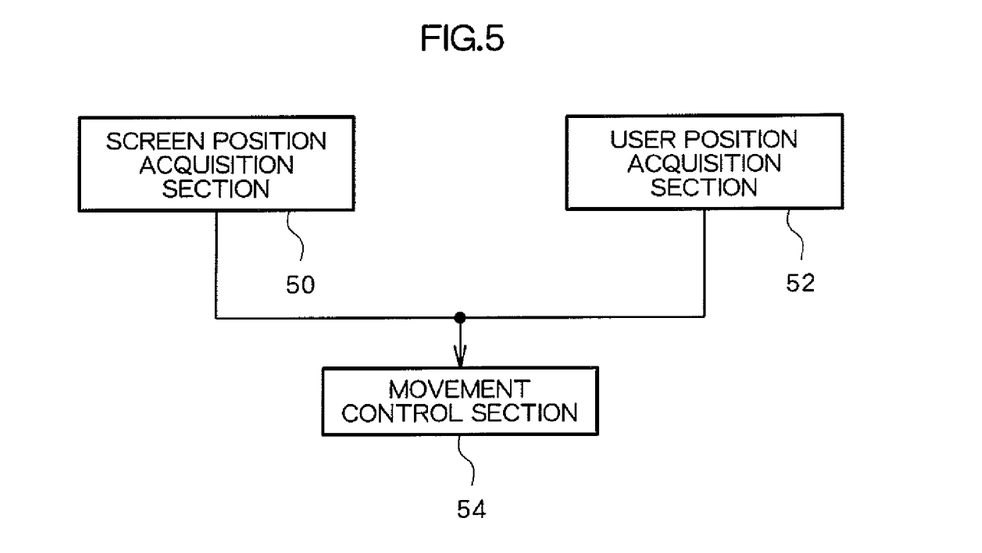
FIG. 5 is a functional block diagram showing an example of functions of the computer.

Hereinafter, description will be given of a specific example of functions implemented by the computer 3 in this embodiment. As shown in FIG. 5, the computer 3 functionally includes a screen position acquisition section 50, a user position acquisition section 52, and a movement control section 54. Those functions are implemented by, for example, the control section 40 of the computer 3 executing the programs stored in the storage section 42.

The screen position acquisition section 50 acquires a position of the display screen 5 within a real space. For example, the screen position acquisition section 50 identifies a relative position of the display screen 5 with respect to the robot apparatus 2 based on the image taken by the camera 14 of the robot apparatus 2. Hereinbelow, a flow chart shown in FIG. 6 will be used to describe a specific example of a processing of acquiring the position of the display screen 5 by the screen position acquisition section 50.

Figure 6:
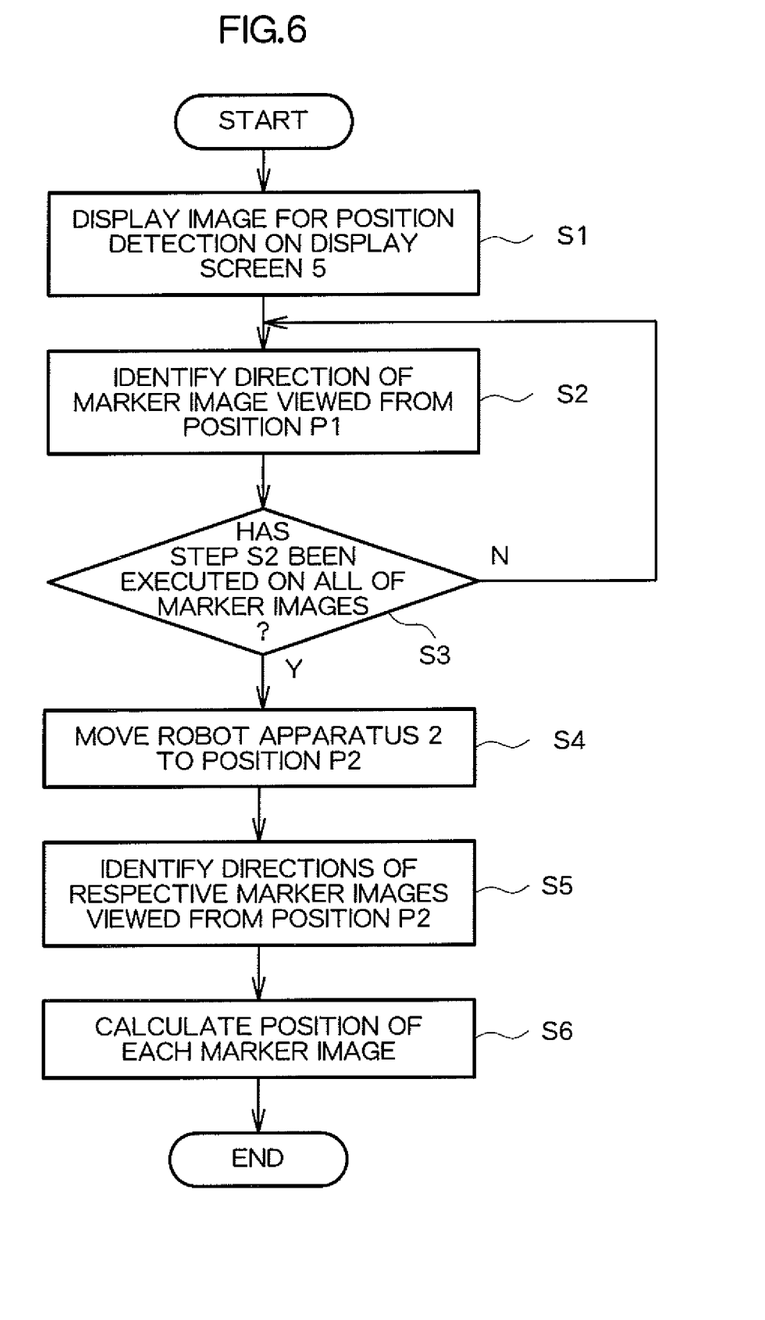
FIG. 6 is a flowchart showing an example of a processing of acquiring a position of a display screen by the computer.
Figure 7:
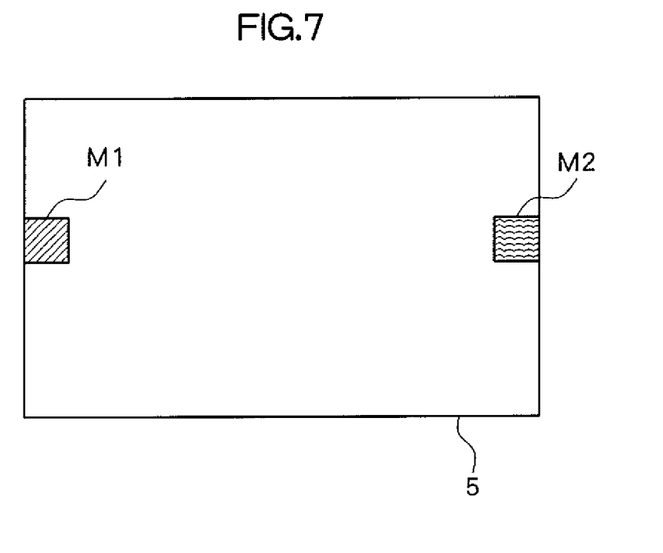
FIG. 7 is a diagram showing an example of an image for position detection.

First, the screen position acquisition section 50 displays a predetermined image for position detection on the display screen 5 (Step S1). The image for position detection is, for example, an image in which a predetermined marker image is placed in a predetermined position. FIG. 7 is a diagram showing an example of the display screen 5 on which the image for position detection is being displayed. In the example of FIG. 7, marker images M1 and M2 are arranged on both of left and right ends of the image for position detection, respectively. The marker image may be merely an image of a predetermined pattern and color, or may be an image embedded with a predetermined identification code in the form of, for example, a two-dimensional barcode.

Subsequently, the screen position acquisition section 50 uses the image taken by the camera 14 of the robot apparatus 2 to identify a direction (azimuth) of the marker image viewed from the current position (hereinafter, referred to as "position P1") of the robot apparatus 2 (Step S2). To be specific, the screen position acquisition section 50 first transmits a control signal to the robot apparatus 2 to thereby control the interface drive section 22 to reorient an image-taking posture of the camera 14. Then, the screen position acquisition section 50 receives the image taken by the camera 14 from the robot apparatus 2. The screen position acquisition section 50 then executes a predetermined pattern matching processing on the received taken image to judge whether or not the taken image contains a marker image. If no marker image is contained, the screen position acquisition section 50 further controls the interface drive section 22 to reorient the image-taking posture of the camera 14, and repeats the processing of detecting a marker image from the taken image again.

If a marker image can be detected from within the taken image, the screen position acquisition section 50 controls the interface drive section 22 to further reorient the image-taking posture of the camera 14 according to a position of the detected marker image within the taken image so that the position of the marker image coincides with the center of the taken image. The screen position acquisition section 50 then acquires information (information indicating a rotation angle with respect to a reference position of the camera 14) indicating an orientation of the image-taking posture of the camera 14 when the marker image is brought to the center of the taken image. The information indicating the orientation of the image-taking posture of this case is information for specifying three-dimensional directions, which is expressed by a combination of information representing a horizontal-direction angle and information representing a vertical-direction angle. If the marker image cannot be detected from within the taken image even by reorienting the image-taking posture of the camera 14 toward all directions possible by the interface drive section 22, the screen position acquisition section 50 controls the main body drive section 24 to move the main body of the robot apparatus 2 to thereby change the position P1, and may execute the detection of the marker image again with the changed position P1 as a reference.

The screen position acquisition section 50 further judges whether or not Step S2 is executed on all of the marker images displayed on the display screen 5 (Step S3). If the directions of all of the marker images have not been identified, the screen position acquisition section 50 repeats Step S2 to identify the direction of another marker image displayed on the display screen 5 and viewed from the position P1. In such a case, if it can be identified at what position the already-detected marker image is placed within the image for position detection, the screen position acquisition section 50 may execute the detection of another marker image by reorienting the image-taking posture of the camera 14 based on the identified information. To be specific, in a case where the image for position detection exemplified in FIG. 7 is displayed on the display screen 5, the screen position acquisition section 50 first detects the marker image M1. In this case, if the detected marker image can be identified as the marker image M1 based on the pattern or color of the detected marker image or the embedded identification code, the screen position acquisition section 50 reorients the image-taking posture of the camera 14 from the orientation used for taking the marker image M1 toward the right side thereof to attempt detection of the marker image M2. Accordingly, with a plurality of marker images being displayed on the display screen, if the first marker image can be detected, the second marker image and the subsequent marker images can be detected relatively easily.

In Step S3, if it is determined that the directions of all of the marker images displayed on the display screen 5 have been identified, the screen position acquisition section 50 then controls the main body drive section 24 of the robot apparatus 2 to move the robot apparatus 2 to a position (hereinafter, referred to as "position P2") spaced apart from the position P1 in a predetermined direction by a predetermined distance (Step S4). The movement direction of this case may be a preset direction or may be a direction determined according to the directions of the respective marker images identified in Step S2. To be specific, for example, the screen position acquisition section 50 moves the robot apparatus 2 to a direction substantially orthogonal to the direction of each of the marker images from the position P1.

The screen position acquisition section 50 further executes processing similar to Steps S2 and S3 by setting the new position P2 of the robot apparatus 2 after the movement performed in Step 4 as a reference, to thereby identify the directions of the respective marker images viewed from the position P2 (Step S5). In Steps 1 to 5, the screen position acquisition section 50 can acquire information indicating the directions of the respective marker images displayed on the display screen 5 and viewed from two points at positions P1 and P2.

Subsequently, based on the information, the screen position acquisition section 50 calculates the position of each marker image within the real space with the position of the robot apparatus 2 as a reference (Step S6). To be specific, the screen position acquisition section 50 calculates the position of the respective marker images corresponding to the current position of the robot apparatus 2 based on differences between the directions identified in Step S2 and the directions identified in Step S5 and information on the distance and azimuth by which the robot apparatus 2 has moved in Step S4. The positions of the respective marker images are expressed by a combination of three coordinate values within a three-dimensional space with the position of the camera 14 as the original position.

Figure 8:
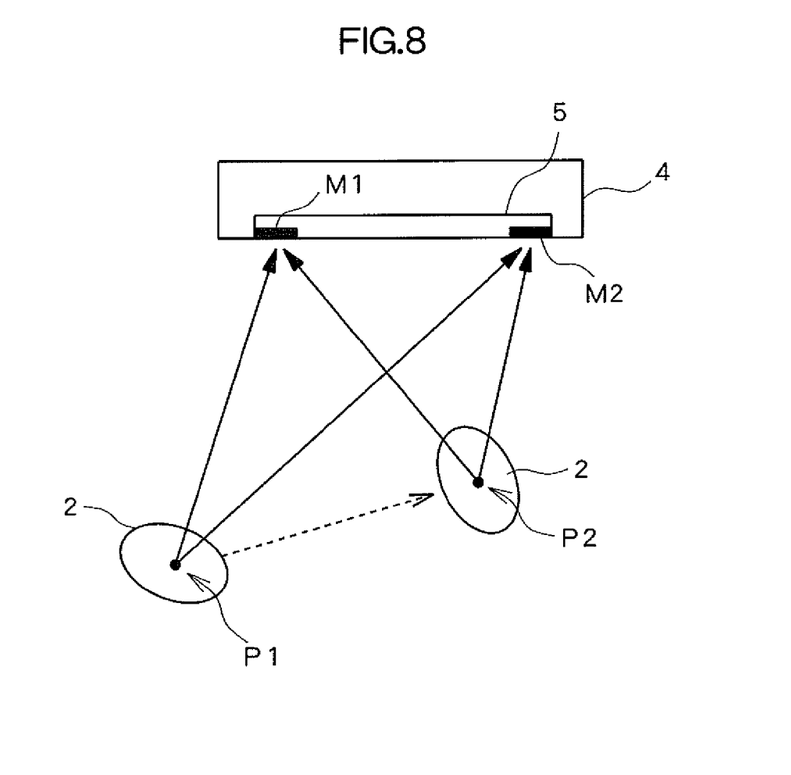
FIG. 8 is a diagram showing a positional relationship between the robot apparatus and the display screen when the processing of acquiring the position of the display screen is executed by the computer.

FIG. 8 is a top view of the robot apparatus 2 and the display screen 5, showing an example of a positional relationship between the robot apparatus 2 and the display screen 5. In FIG. 8, the dotted arrow indicates a route along which the robot apparatus 2 moves, and the solid arrows indicate the directions of the respective marker images identified from the respective positions. As shown in FIG. 8, the screen position acquisition section 50 can identify the positions of the respective marker images by obtaining the directions of the respective marker images viewed from the respective positions P1 and P2, the distance between the positions P1 and P2, and the direction from the position P1 toward the position P2.

According to the above-mentioned processing, the screen position acquisition section 50 can calculate the three-dimensional position of the display screen 5 within the real space with the position of the robot apparatus 2 as a reference. In addition, in the case where the marker images are displayed on both of left and right ends of the display screen 5 as shown in FIG. 7, the screen position acquisition section 50 can also acquire information on a width of the display screen 5 and the orientation (display direction) of the display screen 5 by calculating the positions of the respective marker images. Further, the screen position acquisition section 50 can use information on the width and an aspect ratio of the display screen 5 to calculate a height of the display screen 5. In other words, based on the positions of the respective marker images calculated in Step S6, the screen position acquisition section 50 can acquire information on the three-dimensional position, size, and orientation of the display screen 5 within the real space. Further, after the processing that has been described so far, by continually updating the position information of the robot apparatus 2 based on information detected by the position detection section 26, the computer 3 can identify the position of the display screen 5 with respect to the robot apparatus 2 at any time.

It should be noted that the method described above is a mere example, and the screen position acquisition section 50 may acquire the position of the display screen 5 by another method. For example, if the robot apparatus 2 includes a device such as a range sensor (for example, a laser range finder) for measuring a distance from an object or a stereo camera, the screen position acquisition section 50 may use such a device to measure the distance from the robot apparatus 2 to the display screen 5. This allows the screen position acquisition section 50 to identify the position of the display screen 5 without repeating the processing for identifying the directions of the marker images viewed from a plurality of positions. Alternatively, the screen position acquisition section 50 may identify the positions of the marker images with higher accuracy by repeating the processing for identifying the directions of the marker images viewed from not only the positions P1 and P2 but also further more positions. Alternatively, the above-mentioned processing may be executed on signs or light-emitting devices arranged at predetermined positions in the vicinity of the display screen 5 instead of the marker images displayed on the display screen 5.

Further, the screen position acquisition section 50 may, for example, previously receive input of information representing the width of the display screen 5 to thereby read information on a screen size of the display screen 5 stored in the storage section 42. This allows the screen position acquisition section 50 to identify a range of the area occupied by the display screen 5 within the real space by identifying the position of one marker image without identifying the positions of a plurality of marker images. Note that in this case, the screen position acquisition section 50 may, for example, identify the orientation (display direction) of the display screen 5 viewed from the robot apparatus 2 based on how the shape of the marker image is distorted within the taken image.

The screen position acquisition section 50 executes the above-mentioned processing for acquiring the position of the display screen 5, for example, upon bootup of the computer 3. The screen position acquisition section 50 may further execute the above-mentioned processing every predetermined time, and based on the execution results, update the information obtained upon the previous execution. If it is judged based on the detection results of the position detection section 26 that the user has lifted or moved the robot apparatus 2, the screen position acquisition section 50 may execute the processing for acquiring the position of the display screen 5 again.

The user position acquisition section 52 acquires the position of the user within the real space. To be specific, the user position acquisition section 52, for example, calculates the position of the user's face with the position of the robot apparatus 2 as a reference by the same method as that adopted by the screen position acquisition section 50. In other words, the user position acquisition section 52 performs face recognition processing for recognizing a person's face contained in an image on the image taken by the camera 14, to thereby identify a direction of the position of the user's face with respect to the position of the robot apparatus 2. The user position acquisition section 52 repeats the processing with two arbitrary points as references, and based on information indicating the obtained two directions, calculates the direction of and a distance from the position of the user's face. This allows the user position acquisition section 52 to acquire information indicating the position of the user's face with the position of the robot apparatus 2 as a reference.

In the same manner as the screen position acquisition section 50, the user position acquisition section 52 executes the processing for acquiring the position of the user, for example, upon bootup of the computer 3 or every predetermined time. In addition, the user position acquisition section 52 may execute detection of the user using the image taken by the camera 14 every predetermined time, and if there is a difference between the detected direction of the user and the previously-acquired position of the user by a predetermined value or more, execute the processing for detecting the direction of the user viewed from another point to acquire the position of the user again.

The movement control section 54 moves the robot apparatus 2 based on the position of the display screen 5 acquired by the screen position acquisition section 50 and the position of the user acquired by the user position acquisition section 52.

To be specific, for example, the movement control section 54 first determines a range of positions (hereinafter, referred to as "possible movement area A1") within which the robot apparatus 2 is allowed to move based on the position of the display screen 5 and the position of the user, and based on the determined possible movement area A1, determines a movement position to which the robot apparatus 2 is to be moved within the possible movement area A1. Hereinbelow, description will be given of a specific example of the possible movement area A1 determined by the movement control section 54 in the above-mentioned case.

Figure 9:
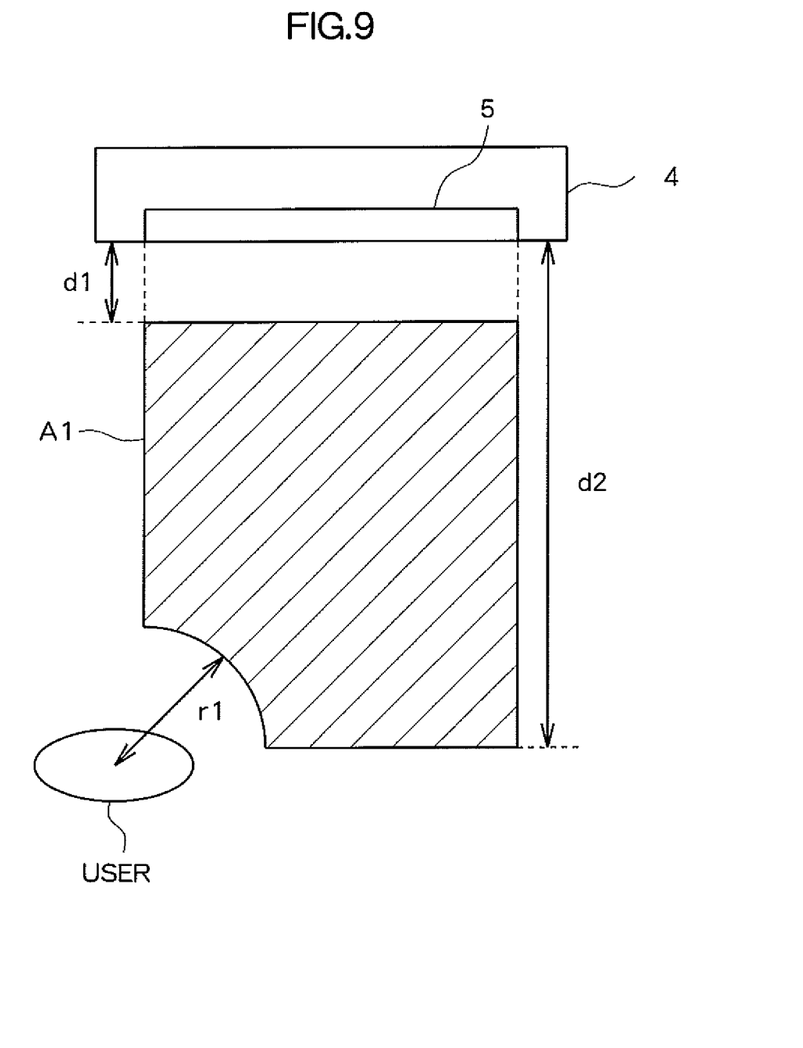
FIG. 9 is a diagram showing an example of a possible movement area determined by the computer.

FIG. 9 is a top view of the display screen 5 and the user, showing an example of the possible movement area A1 determined by the movement control section 54. In FIG. 9, the possible movement area A1 is represented as the shaded area. In the example of FIG. 9, the possible movement area A1 is positioned in front of the display screen 5 (that is, in the display direction of the display screen 5), representing an area obtained by subtracting a circular area having a radius of "r1" with the user as the center from a rectangular area whose distance "d" from the display screen 5 satisfies the expression "d1≦d≦d2", where each of "d1", "d2", and "r1" may be a predetermined value or a value determined based on the distance between the user and the display screen 5. Such an area is determined as the possible movement area A1, so the robot apparatus 2 can move within a range in front of the display screen 5 (that is, range that allows the user to visually recognize the robot apparatus 2 along with the display screen 5 with ease) while maintaining some distance from both the display screen 5 and the user.

Figure 10A:
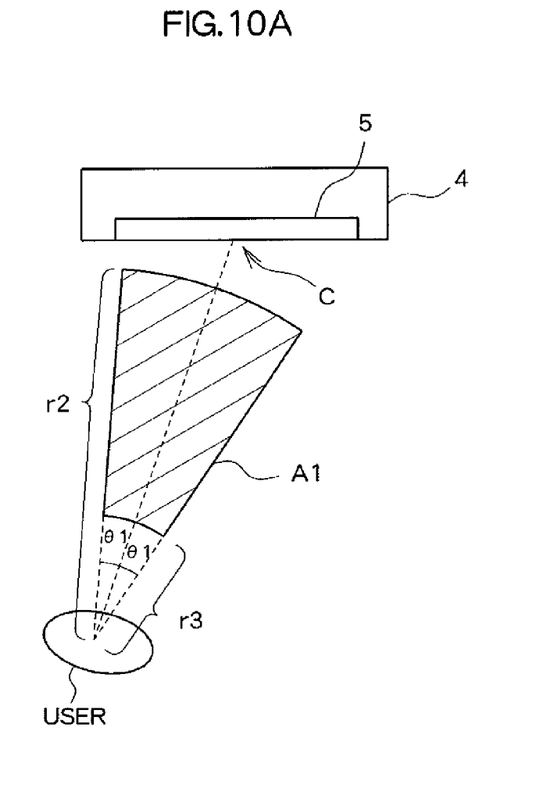
FIGS. 10A and 10B are diagrams showing another example of the possible movement area determined by the computer.
Figure 10B:
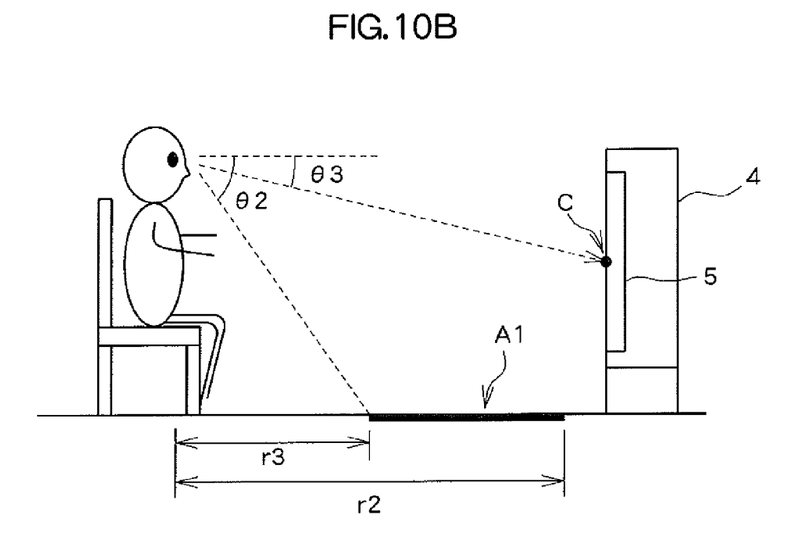

FIG. 10A is a top view of the display device 4 and the user in a similar manner to FIG. 9, showing another example of the possible movement area A1. In the example of FIG. 10A, the possible movement area A1 is represented as the shaded area obtained by subtracting a circular area having a radius of "r3" with the user as the center from a fan-shaped area having a radius of "r2" with the user as the center when viewed from above. In this case, both sides of the fan shape are straight lines inclined a predetermined angle "θ1" from a straight line connecting a center position C of the display screen 5 and the user. In other words, each point within the possible movement area A1 deviates from a direction toward the center position C of the display screen 5 viewed from the user by an angle equal to or smaller than a predetermined value, and has a distance "r" satisfying the expression "r3≦r≦r2" from the user. FIG. 10B is a side view of the possible movement area A1 shown in FIG. 10A. In FIG. 10B, an angle θ2 represents a depression angle with reference to the position of the user's face with respect to the point on a floor surface which is spaced apart from the user by the distance "r3". An angle θ3 represents a depression angle with reference to the position of the user's face with respect to the center position C of the display screen 5. At this time, the distance "r3" is determined so that a difference between the angles "θ2" and "θ3" is equal to or smaller than a predetermined value. In other words, the possible movement area A1 in the example of FIG. 10B is set as an area in which an angle formed between a direction of each point within the possible movement area viewed from the position of the user and a direction of the display screen 5 viewed from the position of the user is equal to or less than a predetermined value. According to this setting, whichever position within the possible movement area A1 the robot apparatus 2 may move to, it is possible to reduce a moving amount of a point of view when the user shifts their point of view between the robot apparatus 2 and the display screen 5.

Figure 11:
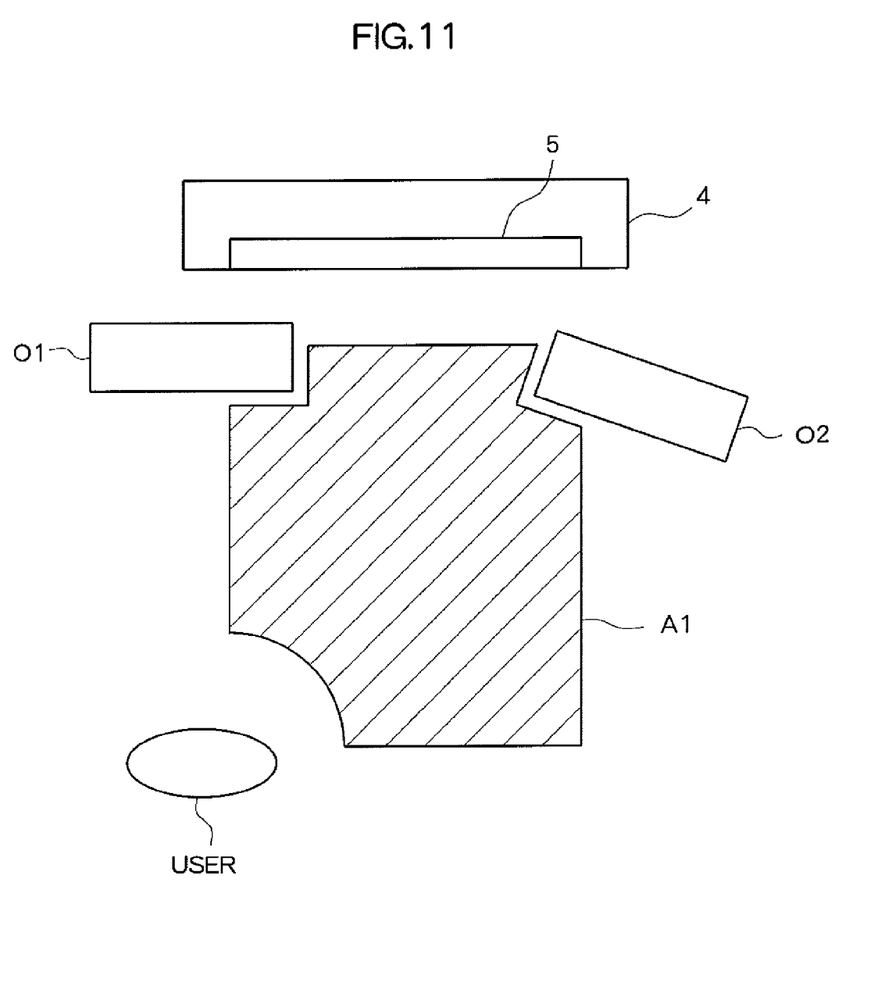
FIG. 11 is a diagram showing yet another example of the possible movement area determined by the computer.

In addition, in consideration of other information on an environment surrounding the display screen 5 and the user, the movement control section 54 may determine the position to which the robot apparatus 2 is to be moved. To be specific, the movement control section 54 may determine the possible movement area A1 by, for example, acquiring a position of an obstacle such as a table placed in the room and excluding the position of the obstacle from the possible movement area A1 determined by the method described so far. The movement control section 54 may also exclude an area that becomes hidden behind the obstacle when viewed from the user from the possible movement area A1. In this case, for example, the position of the obstacle may be previously inputted by the user as a relative position with respect to the display device 4. Alternatively, the position of the obstacle may be detected by the camera 14 or object detection means such as an infrared sensor (not shown) provided to the robot apparatus 2. FIG. 11 is a diagram showing an example of the possible movement area A1 determined by the above-mentioned method in a case where there exist obstacles O1 and O2 in the room.

After the possible movement area A1 is determined by the method described above, the movement control section 54 moves the robot apparatus 2 based on the determined possible movement area A1. To be specific, for example, the movement control section 54 receives a movement instruction to move the robot apparatus 2 according to an operation input from the user or a content of a processing executed by the computer 3. The movement control section 54 then judges whether or not the position to be reached by the robot apparatus 2 that has been moved according to the movement instruction is included in the possible movement area A1. If the position to be reached after the movement according to the movement instruction is included in the possible movement area A1, the movement control section 54 moves the robot apparatus 2 according to the content of the movement instruction. If the position to be reached after the movement according to the movement instruction exists outside the possible movement area A1, the movement control section 54 aborts the movement of the robot apparatus 2 according to the movement instruction. This judgment can impose a limitation on the robot apparatus 2 that attempts to move out of the possible movement area A1. Alternatively, the movement control section 54 repeatedly executes movement control on the robot apparatus 2 moving according to the movement instruction, and, if the robot apparatus 2 has moved out of the possible movement area A1 as a result of the executed movement control, may execute such movement control as to return the robot apparatus 2 back into the possible movement area A1.

Figure 12:
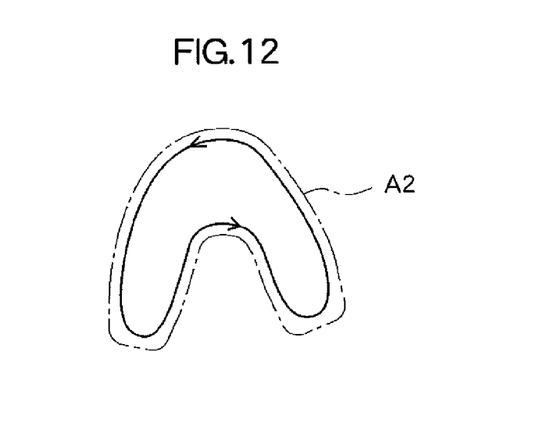
FIG. 12 is a diagram showing an example of a shape of a planned movement area.

Further, based on the possible movement area A1 determined by the method described so far and a planned movement area A2 determined according to a content of the processing executed by the computer 3, the movement control section 54 may determine the range within which the robot apparatus 2 is actually moved by the processing. In a specific example in which the computer 3 executes a game processing for a racing game, the robot apparatus 2 reproduces movements of a racing car running on a predetermined circuit track within a virtual space in the racing game according to an instruction issued by the computer 3. In this case, the robot apparatus 2 moves along a route defined by a shape of the predetermined circuit track within the real space. In other words, the planned movement area A2 for the robot apparatus 2 is determined according to the shape of the circuit track used in the racing game. FIG. 12 is a diagram showing an example of the shape of the planned movement area A2 corresponding to such a circuit track.

In this example, the movement control section 54 changes a size and an orientation of the planned movement area A2 by performing a magnification, a reduction, a rotation, or the like so as to include the planned movement area A2 in the possible movement area A1. To be specific, for example, position coordinates of a reference position of the planned movement area A2 on the floor surface is set as (x, y), and an inclination of the planned movement area A2 with respect to a predetermined reference axis is set as "φ". While changing "x", "y", and "φ" within a predetermined range, the movement control section 54 calculates, for each combination of "x", "y", and "φ", a magnification by which the planned movement area A2 becomes largest within a range that satisfies the condition that the planned movement area A2 is included in the possible movement area A1. The position and inclination of the planned movement area A2 in the real space is determined from the combination of "x", "y", and "φ" that can maximize the magnification, and the size of the planned movement area A2 is determined based on the maximized magnification. The movement control section 54 further moves the robot apparatus 2 according to the content of the processing executed by the computer 3 within the planned movement area A2 thus determined.

Figure 13:
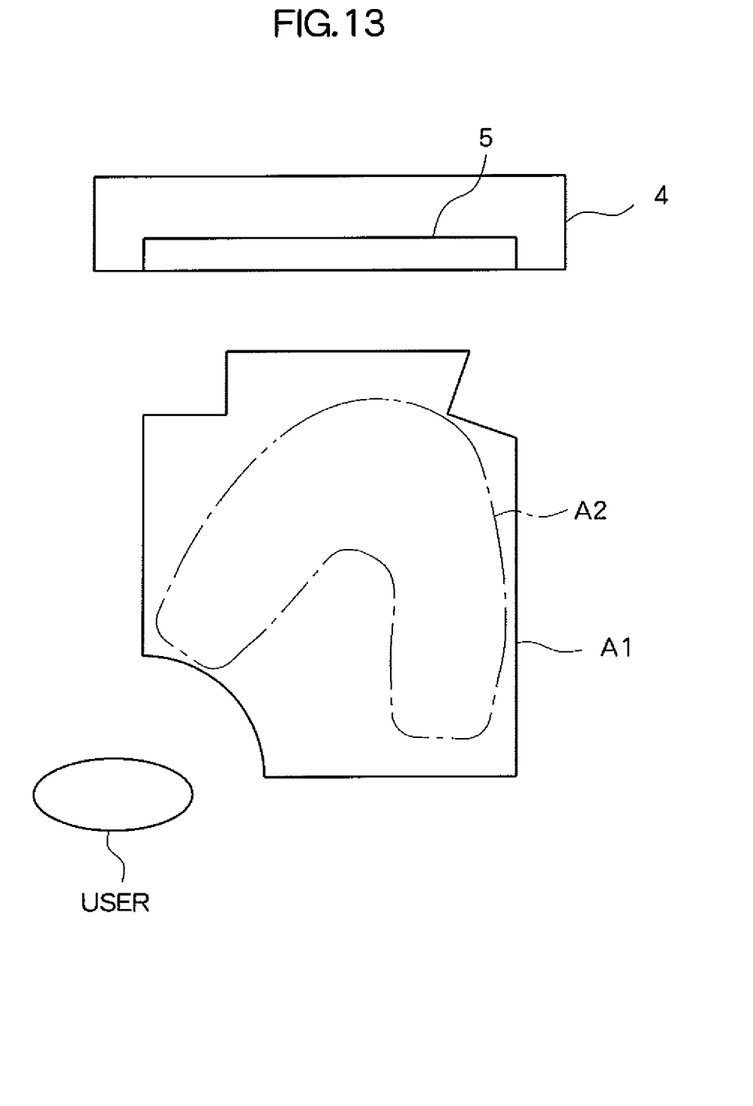
FIG. 13 is a diagram showing an example of a positional relationship between the possible movement area and the planned movement area.

For example, in a case where the movement control section 54 determines the possible movement area A1 as shown in FIG. 11 and attempts to move the robot apparatus 2 within the planned movement area A2 having a shape shown in FIG. 12, the movement control section 54 determines the position, inclination, and size of the planned movement area A2 within the real space as exemplified in FIG. 13. Accordingly, the robot apparatus 2 can be moved to a maximum extent within the range that allows the user to visually recognize the robot apparatus 2 along with the display screen 5 with ease.

Based on the position of the user acquired by the user position acquisition section 52, the movement control section 54 may further change the direction in which the robot apparatus 2 inputs/outputs information. To be specific, for example, while moving the position of the robot apparatus 2, the movement control section 54 controls the interface drive section 22 to change the orientation of the interface section 10 based on the direction of the user viewed from the position reached after the movement. Accordingly, the camera 14, the microphone 16, the display 18, and the speaker 20 are reoriented toward the user, so the robot apparatus 2 can execute input/output of information from/to the user in such a manner as to reduce a burden on the user.

Further, the computer 3 not only controls the movement position of the robot apparatus 2, but may also change the content of the image displayed on the display screen 5 according to the positional relationship among the display screen 5, the robot apparatus 2, and the user. To be specific, for example, the computer 3 changes an on-screen position of each of various display elements displayed on the display screen 5 according to the position of the robot apparatus 2 moved by the movement control section 54 and the position of the user.

Figure 14A:
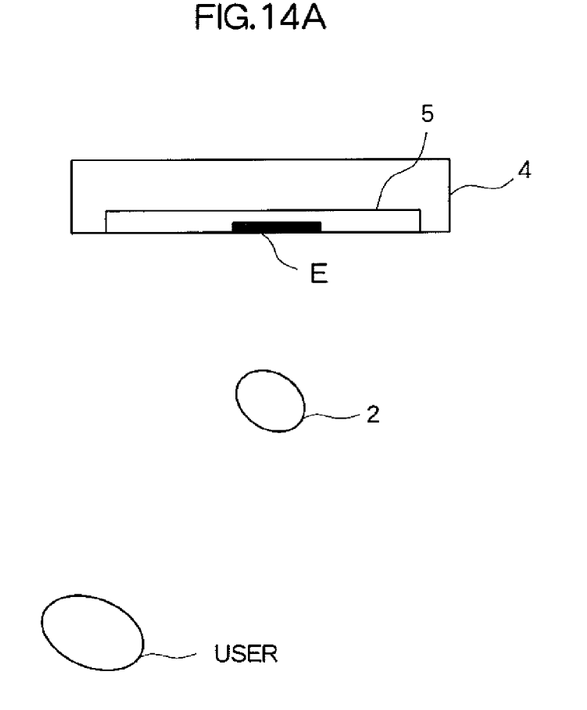
FIGS. 14A and 14B are diagrams of an example of a positional relationship among the user, the robot apparatus, and the display screen and an image displayed on the display screen according to the positional relationship.
Figure 14B:
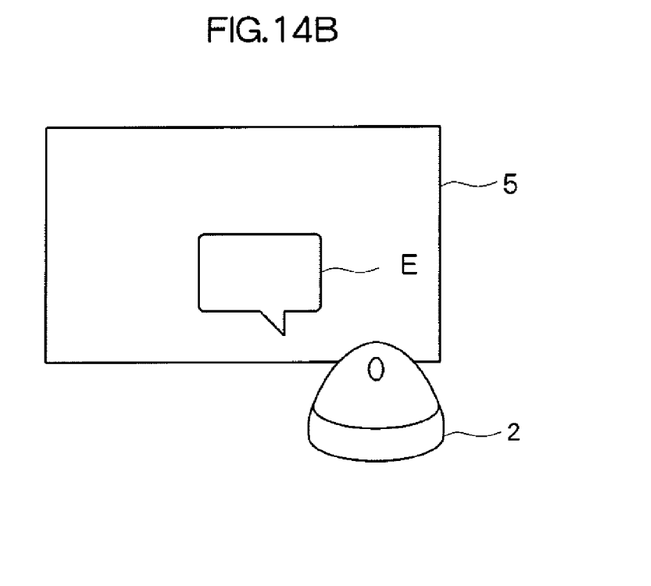
Figure 15A:
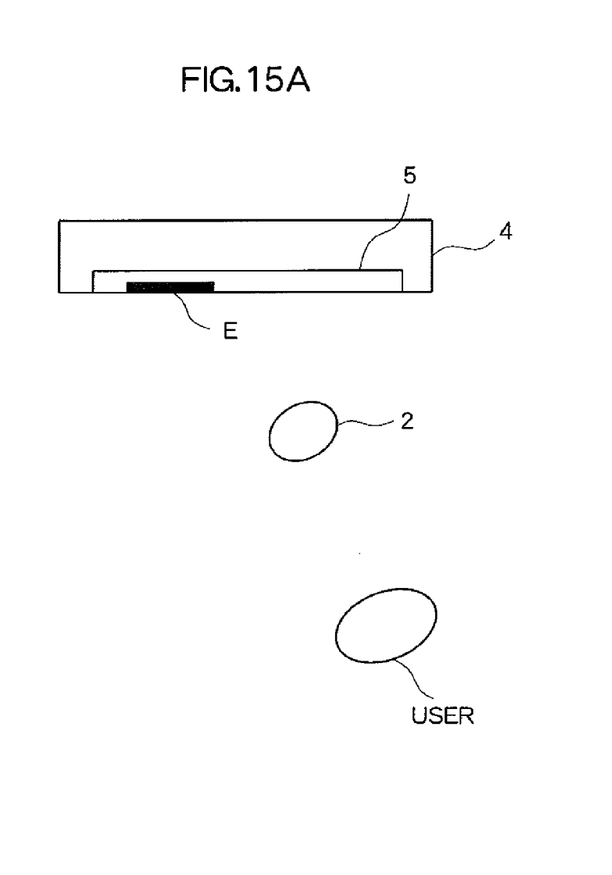
FIGS. 15A and 15B are diagrams of another example of the positional relationship among the user, the robot apparatus, and the display screen and an image displayed on the display screen according to the positional relationship.
Figure 15B:
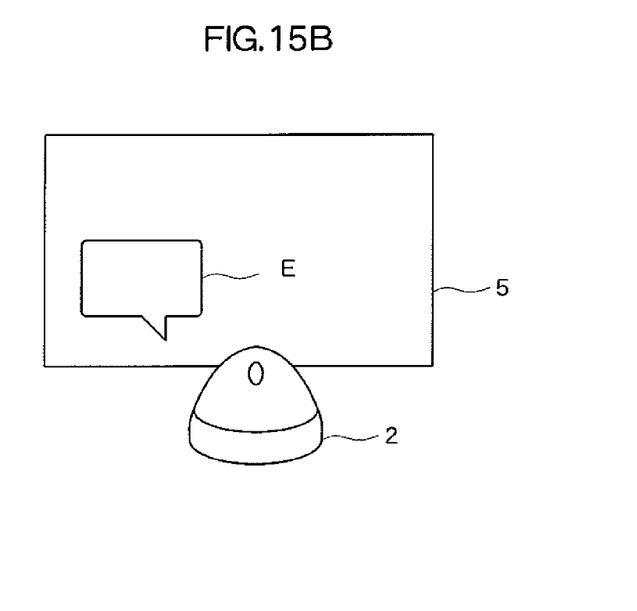

FIGS. 14A, 14B, 15A, and 15B are explanatory diagrams showing a specific example of such a control. FIG. 14A is a diagram showing an example of the positional relationship among the robot apparatus 2, the display screen 5, and the user. In the example of FIG. 14A, for example, the computer 3 displays a display element E resembling a balloon on a comic book in such a position within the display screen 5 as indicated by a solid portion in FIG. 14A. This allows the user to view the balloon being displayed to the left of the robot apparatus 2 as shown in FIG. 14B. If the positional relationship among the user, the robot apparatus 2, and the display screen 5 is in such a state as shown in FIG. 15A, the computer 3 displays the same display element E as in FIG. 14A in such a position within the display screen 5 as indicated by a solid portion in FIG. 15A. This allows the user to view the balloon being displayed to the left of the robot apparatus 2 as shown in FIG. 15B similarly to the example of FIG. 14B. In this case, the computer 3 may change not only the position of the display element E but also its size and shape by changing, for example, the width scale of the display element E to be displayed according to how the display screen 5 inclines when viewed from the position of the user. Accordingly, if the position of the user changes with respect to the display screen 5, the information processing system 1 can control the display element E displayed on the display screen 5 and the robot apparatus 2 to keep the same positional relationship therebetween, which makes it possible to reduce a sense of incongruity imparted to the user.

Hereinafter, description will be given of examples of the game processing executed by the information processing system 1 as described above. Described as the first example is an example of executing a Japanese traditional game called "Daruma-san ga koronda", which is a resemblance to the English and American game "Red Light, Green Light". In this game, the user who plays the role of "it" utters a predetermined phrase such as "Daruma-san ga koronda". Starting from a predetermined position, the robot apparatus 2 repeats an act of moving toward the position of the user only while the user is uttering the phrase. If the robot apparatus 2 moves after the user finishes uttering the phrase, the user wins. If the robot apparatus 2 reaches a point whose distance from the user is equal to or less than a predetermined value, the user loses.

In the case of executing the game, the computer 3 first acquires the position of the user and the position of the display screen 5 to thereby determine a position between the user and the display screen 5 which is closer to the display screen 5 as a start point, and moves the robot apparatus 2 to the start point. Based on information on the user's voice acquired by the microphone 16, the computer 3 moves the robot apparatus 2 toward the position of the user only while the user is uttering the phrase. The computer 3 also displays a progress of the game and information relating to game results obtained so far on the display screen 5. Accordingly, the user can enjoy playing the game by confirming the position of the robot apparatus 2 while confirming the information displayed on the display screen 5 as the need arises without shifting their point of view significantly. In addition, in a case of repeating the execution of the game, the robot apparatus 2 can be set to automatically move back to a predetermined start point from a position at which the first game has ended without the movement being explicitly instructed by the user.

Next, description will be given of an example in which the information processing system 1 executes a golf game as the second example. In this case, the robot apparatus 2 which plays the role of a caddie moves to a position that satisfies a predetermined condition with respect to the position of the user and the position of the display screen 5 (for example, a position at which the robot apparatus 2 faces the display screen 5 side by side with the user). As the game progresses, the robot apparatus 2 outputs information such as a useful tip for the user from the speaker 20 as sound information or displays the information on the display 18. In addition, during the progress of the game, in order to cause the user to pay attention to the display screen 5, the robot apparatus 2 changes the orientation of the camera 14 toward the display screen 5, while in order to cause the user to pay attention to the robot apparatus 2 itself, the robot apparatus 2 moves around the spot or outputs voice information from the speaker 20. Accordingly, it is possible to produce such an effect that the user may feel as if a real caddie is standing near the user, not on the screen but in the real space, which can make the game more true-to-life.

As has been described above, according to the information processing system 1 of this embodiment, by moving the robot apparatus 2 to the position according to the position of the display screen 5 and the position of the user, the user can eliminate time and labor for changing their position according to the content of the processing of the computer 3 or manually moving the robot apparatus 2, and as a result the information processing system 1 can alleviate the load on the user.

Note that the present invention is not limited to the above-mentioned embodiment. For example, a part or the entirety of the processing executed by the control section 40 of the computer 3 in the above-mentioned description may be implemented by the control section 30 of the robot apparatus 2. In addition, the display device 4 may be, for example, a projector. In this case, the display screen 5 represents a screen onto which an image is projected, which is provided separately from a projector main body.

Further, the above-mentioned functions of the user position acquisition section 52 are not essential. In general, the user is presumed to be in a position according to the display direction of the display screen 5 in order to view the display screen 5. Therefore, for example, if the screen position acquisition section 50 can acquire the position and display direction of the display screen 5, the movement control section 54 determines the position to which the robot apparatus 2 is to be moved according to the position and display direction of the display screen 5 acquired by the screen position acquisition section 50. As a specific example, the movement control section 54 moves the robot apparatus 2 to a position that is within a predetermined distance from the display screen 5 toward the display direction thereof. Accordingly, the information processing system 1 of this embodiment can move the robot apparatus 2 to such a position as to allow the user to visually recognize the robot apparatus 2 along with the display screen 5 with ease without the need to identify the position of the user.

Further, there exists one user around the robot apparatus 2 in the above-mentioned description, but a plurality of users may be present around the robot apparatus 2. In this case, for example, the user position acquisition section 52 calculates a feature amount (for example, a size of each of portions composing a face or a positional relationship therebetween) of each face detected from within the image taken by the camera 14 to thereby identify each of a plurality of faces that have been detected. This allows the user position acquisition section 52 to acquire positions of each of the plurality of users. The movement control section 54 executes the above-mentioned movement control by, for example, using a barycentric position of the positions of the plurality of users acquired by the user position acquisition section 52 as a representative position of the users. Alternatively, the user position acquisition section 52 may identify whose face is detected thereby, and use the position of the face identified as belonging to a predetermined person as the representative position of the users.

Further, the information processing system 1 acquires the relative positions of the display screen 5 and the user with respect to the position of the robot apparatus 2 in the above-mentioned description, but may acquire the positions of the display screen 5 and the user with another position as a reference. For example, the information processing system 1 may use a camera provided on the display device 4 to take an image of the user, and identify the position of the user with respect to the display device 4 based on the taken image. In this case, the position of the display screen 5 is expressed by a predetermined value (for example, a value indicating the original position of a coordinate system), and can be acquired by a method of reading a value stored in the storage section 42. Further, in this case, the information processing system 1 may implement control for moving the robot apparatus 2 to the position according to the position of the display screen 5 and the position of the user by taking the image of the robot apparatus 2 by the camera provided on the display device 4 and identifying the position of the robot apparatus 2.

What is claimed is:

1. An information processing system, comprising:
a display device configured to display an image on a display screen;
a robot apparatus configured to perform input/output of information from/to a user, the display device being separate from the robot apparatus;
screen position acquisition means configured to acquire a position of the display screen in a real space;
user position acquisition means configured to acquire a position of the user in the real space; and
movement control means configured to: (i) determine a range of positions within which the robot apparatus is allowed to move based on the position of the display screen and the position of the user, (ii) move the robot apparatus based on the position of the display screen acquired by the screen position acquisition means and the position of the user acquired by the user position acquisition means, and (iii) determine a possible movement area for the robot apparatus based on the position of the display screen and the position of the user, and moves the robot apparatus according to the determined possible movement area,
wherein the possible movement area includes an area located between the position of the user and the position of the display screen, excluding a first buffer area located at least partially around the position of the user, and excluding a second buffer area located at least partially around the position of the display screen, and the robot apparatus is configured to be moved within the range, and allows the user to visually recognize the robot apparatus and the display screen with ease.

2. An information processing system according to claim 1, wherein the possible movement area comprises an area in which an angle formed between a line drawn from the position of the user toward each point within the possible movement area and a line drawn from the position of the user toward the display screen is equal to or less than a predetermined value.

3. An information processing system according to claim 1, wherein the movement control means changes a direction in which the robot apparatus inputs/outputs information based on the position of the user.

4. An information processing system according to claim 1, further comprising means for changing a position of a display element displayed on the display screen according to the position of the robot apparatus moved by the movement control means and the position of the user.

5. A robot apparatus for performing input/output of information from/to a user, which is connected to a display device for displaying an image on a display screen, comprising:
screen position acquisition means configured to acquire a position of the display screen in a real space;
user position acquisition means configured to acquire a position of the user in the real space; and
movement control means configured to: (i) determine a range of positions within which the robot apparatus is allowed to move based on the position of the display screen and the position of the user, (ii) move the robot apparatus based on the position of the display screen acquired by the screen position acquisition means and the position of the user acquired by the user position acquisition means, and (iii) determine a possible movement area for the robot apparatus based on the position of the display screen and the position of the user, and moves the robot apparatus according to the determined possible movement area, wherein the possible movement area includes an area located between the position of the user and the position of the display screen, excluding a first buffer area located at least partially around the position of the user, and excluding a second buffer area located at least partially around the position of the display screen, and the robot apparatus is configured to be moved within the range, and allows the user to visually recognize the robot apparatus and the display screen with ease.

6. A control method for a robot apparatus for performing input/output of information from/to a user, which is connected to a display device for displaying an image on a display screen, comprising:

acquiring a position of the display screen in a real space;
acquiring a position of the user in the real space;
determining a range of positions within which the robot apparatus is allowed to move based on the position of the display screen and the position of the user;
moving the robot apparatus, with movement control means, based on the position of the display screen and the position of the user; and
determining a possible movement area for the robot apparatus based on the position of the display screen and the position of the user, and moving the robot apparatus according to the determined possible movement area,
wherein the possible movement area includes an area located between the position of the user and the position of the display screen, excluding a first buffer area located at least partially around the position of the user, and excluding a second buffer area located at least partially around the position of the display screen, and the robot apparatus is moved within the range, and the method allows the user to visually recognize the robot apparatus and the display screen with ease.

* * * * *